United States Patent [19]
Radford et al.

[11] Patent Number: 5,854,154
[45] Date of Patent: Dec. 29, 1998

[54] PROCESS OF MAKING OXIDE CERAMIC COMPOSITES

[75] Inventors: Kenneth Charles Radford, North Huntingdon; Jay Edgar Lane, New Alexandria, both of Pa.

[73] Assignee: Westinghouse Electric Corporation, Pittsburgh, Pa.

[21] Appl. No.: 847,248

[22] Filed: May 1, 1997

Related U.S. Application Data

[63] Continuation of Ser. No. 573,054, Dec. 15, 1995, abandoned.

[51] Int. Cl.$^6$ ..................................................... C04B 35/80
[52] U.S. Cl. ........................... 501/95.2; 501/12; 427/226; 264/621; 264/641; 264/681; 264/648
[58] Field of Search .................... 501/12, 95.2; 427/226; 264/621, 641, 681, 648

[56] References Cited

U.S. PATENT DOCUMENTS

| | | | |
|---|---|---|---|
| 4,921,822 | 5/1990 | Luthra | 501/95 |
| 5,053,175 | 10/1991 | Birchall et al. | 501/95 |
| 5,104,636 | 4/1992 | Davis et al. | 501/12 |
| 5,306,555 | 4/1994 | Ramamurthi et al. | 501/12 |
| 5,344,512 | 9/1994 | Colonban et al. | |
| 5,399,440 | 3/1995 | Lespade et al. | 501/95 |
| 5,422,319 | 6/1995 | Stempin et al. | 501/95 |
| 5,488,017 | 1/1996 | Szweda et al. | 501/95 |
| 5,506,061 | 4/1996 | Kindl et al. | 428/549 |
| 5,569,422 | 10/1996 | Astier et al. | 501/95.2 |

FOREIGN PATENT DOCUMENTS

| | | |
|---|---|---|
| 0 331 160 | 6/1989 | European Pat. Off. |
| 0 477 505 | 1/1992 | European Pat. Off. |
| 0 498 698 | 12/1992 | European Pat. Off. |

OTHER PUBLICATIONS

Chemical Abstracts, vol. 107, No. 14, Oct. 1987, "Manufacture of Reinforced Metal Composites".

Chemical Abstracts, vol. 116, No. 24, Jun. 1992, "Cones of Acoustic Devices".

Chou, Y.–S. et al., "Fabrication of Continuous–Fiber–Reinforced Polycrystalline Oxide Composites via Molten Salt Infiltration", *J. Am. Ceramic Soc.* 1994, 77(5), 1361–1365, No Month.

Claussen, N. et al., "Reaction Bonding of Aluminum Oxide (RBAO)", *J. of the Ceramic Society of Japan* 1995, 103(8), 749–758, No Month.

Ikeguchi, T. and Kawaike, "Effects of Closed–Circuit Gas Turbine Cooling Systems on Combined Cycle Performance", *ASME Joint International Power Generation Conference* Oct. 2–6, 1994, Phoenix, Arizona.

Janssen, R. et al., "Fiber Reinforcement of Reaction Bonded Oxide Ceramics" in High–Temperature Ceramic–Matrix Composites II; Manufacturing and Materials Development, Evans, A.G., ed., *Ceramic Transactions* 1995, 58, 167–173, No Month.

Lundberg, R. and Eckerborn, "Design and Processing of All–Oxide Composites" in High–Temperature Ceramic–Matrix Composites II; Manufacturing and Materials Development, *Ceramic Transactions* 1995, 58, 95–104, No Month.

Schneider, S., ed., "Engineered Materials Handbook, vol. 4, Ceramics and Glasses", ASM International, The Materials Information Society, 1991, pp. 759–760, No Month.

Zelinsk, J.J. and Uhlmann, "Gel Technology in Ceramics", *J. Phys. Chem. Solids* 1984, 45(10), 1069–1090, No Month.

*Primary Examiner*—Karl Group
*Attorney, Agent, or Firm*—David G. Maire; Daniel C. Abeles; Eckert Seamans Cherin & Mellott, LLC

[57] ABSTRACT

An oxide ceramic composite suitable for fabricating components of combustion turbines and similar high temperature environments. The composite is fabricated by dispersing metal particles in a fiber preform and infiltrating the fiber preform with sol-gel matrix precursor material. Alternatively, the metal particles are mixed into the sol-gel matrix precursor material and the preform is infiltrated with the mixture. Later in the fabrication process, the metal particles oxidize and become oxidized metal when the sol-gel matrix precursor material is sintered. The oxidized metal has more volume and mass than the metal particles. As a result, the oxidized metal contributes to increasing the density of the composite so that it is suitable for use in combustion turbines and similar high temperature environments.

9 Claims, 4 Drawing Sheets

PROCESS OF MAKING OXIDE CERAMIC COMPOSITES

Application is a Continuation In Part of application Ser. No. 08/573,054, filed Dec. 15, 1995, now abandoned.

FIELD OF THE INVENTION

The present invention relates to oxide ceramic composites used in high temperature environments. More specifically, the present invention relates to a device, method, and system for fabricating and using high percent theoretical density, oxide ceramic composites which can withstand conditions similar to those found in combustion turbines.

BACKGROUND OF THE INVENTION

Combustion turbines are a large and growing source of power generation in the United States and abroad. However, due to environmental concerns, combustion turbine vendors need to modify operating parameters of the turbines they sell. In particular, environment laws require reduced turbine emmissions and turbine users demand higher efficiencies. One method to reduce emissions and increase efficiency is to operate turbines at higher temperatures. Another method to increase efficiency is to reduce cooling to the hot sections of the turbine. Both of these methods require turbine components located in the hot sections of a turbine to perform at higher temperatures.

Currently used materials do not allow components to perform at higher temperatures. As a result, currently used materials do not permit higher turbine operating temperatures nor reduced component cooling. The prior art discloses the use of metal components in the hot sections of turbines and the turbine blades. However, metal components fail at elevated temperatures.

The prior art discloses that ceramic components are strong and can withstand the elevated temperatures and high oxidation environment found in combustion turbines. However, ceramic components are brittle and will fail catastrophically through impact or thermal shock stresses. Fiber reinforced ceramic matrix composites ("composites") overcome the brittleness deficiency. Composites are ceramic materials made by infiltrating a fiber preform with a matrix precursor material. The material in the preform is then converted into its final form, which is the composite matrix, and machined to size.

Composites can be fabricated from two types of material: oxides and non-oxides. However, the prior art discloses shortcomings which prevent the use of the non-oxide type of material to make composites for use in turbines and similar environments.

The use of non-oxide composites is limited by the highly oxidizing environment of a turbine. A non-oxide ceramic composite will oxidize at high temperatures and fail, precluding its use in turbines and similar environments. Non-oxide composites will experience oxidation at temperatures as low as 800° C. However, components in hot sections of turbines can reach 1600°C. Even higher temperatures are anticipated for turbines with reduced emissions and increased efficiencies. Overcoming this problem of non-oxide composites has not been solved.

The prior art discloses that oxide composites are better candidates for applications in oxidizing environments due to their inherent oxidation resistance. However, no method exists which allows the fabrication of oxide composites of sufficient strength, particularly oxide composites in complex, three-dimensional shapes required for turbine components.

Oxide composites do not have the required strength for turbine-like environments due to low percent theoretical density in forms other than hot-pressed parts which cannot be made with 3-D fiber weaves or in complex geometric shapes. Theoretical density is the density of a composite as if it does not contain any voids. Percent theoretical density is the actual density of the composite divided by its theoretical density.

Voids develop during composite fabrication and weaken oxide composites. When the matrix precursor material dries, the volatiles in the material volatilize, thereby forming voids. Matrix yields in oxide precursors are much lower than for non-oxides and densities for oxide composites are lower than for non-oxides. For example, sol-gel, a common matrix precursor material which forms an oxide matrix, is 85–90% volatiles. Repeated applications, known as infiltrations, of sol-gel can increase percent theoretical density. However, repeated infiltrations increase cost and do not result in a sufficiently strong composite because percent theoretical densities above approximately 70% are difficult to achieve. The prior art estimates that oxide composites need to have a percent theoretical density of 80–90% for use in high temperature, turbine-like environments.

It is clear that there is a need for an economically feasible ceramic composite material to be used in high-temperature, combustion turbine-like environments. This need will only increase as the demand for higher operating temperatures in combustion turbines increases.

SUMMARY OF THE INVENTION

According to one embodiment of the instant invention, an oxide ceramic composite item is prepared by providing a fiber preform in the approximate desired shape of the finished item, dispersing metal particles throughout at least a portion of the preform, infiltrating the volume with a sol-gel matrix precursor material, and sintering the sol-gel matrix precursor material to the oxide ceramic as well as oxidizing the metal particles to their respective oxide.

According to a second embodiment of the instant invention, the metal particles are mixed into the sol-gel matrix precursor material, the fiber preform is infiltrated with the resulting mixture, and the sol-gel matrix precursor material is sintered into the oxide ceramic matrix as well as oxidizing the metal particles to their respective oxide.

According to an additional embodiment of the instant invention, a system for forming an oxide ceramic consists of a fiber preform, metal particles, and sol-gel matrix precursor material.

DETAILED DESCRIPTION OF THE PREFERRED EMBODIMENTS

Figure 1:
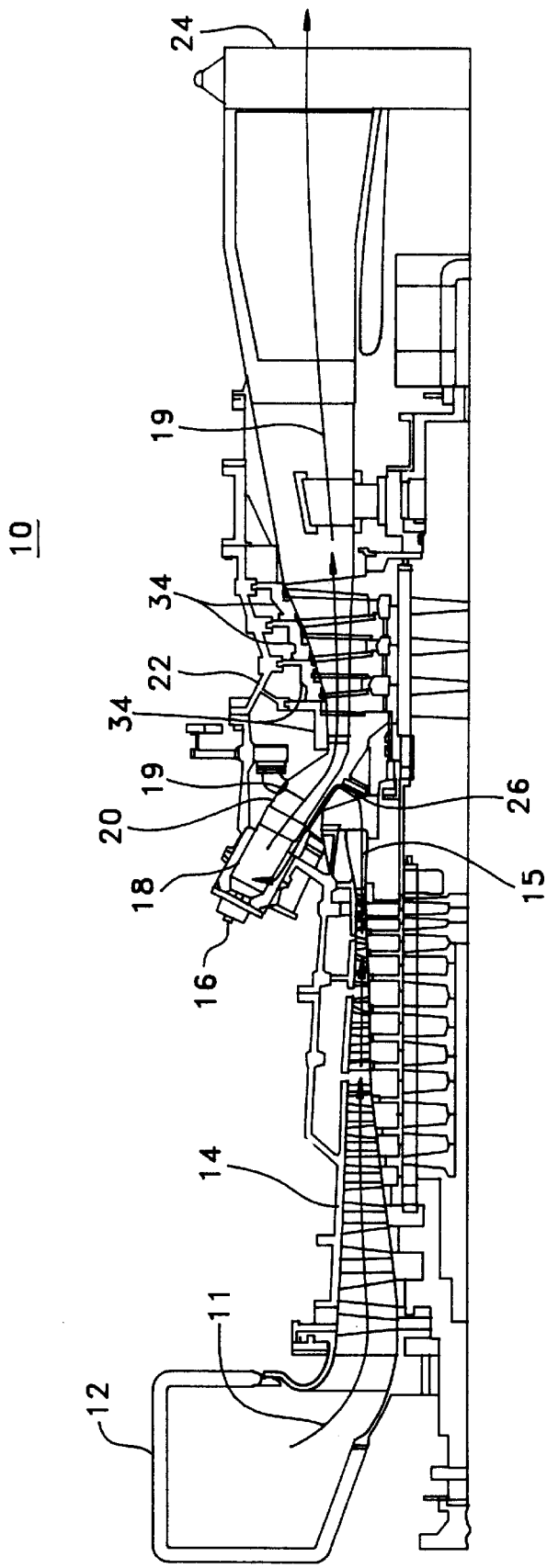
FIG. 1 is a cross-section longitudinal view of a turbine.
Figure 2:
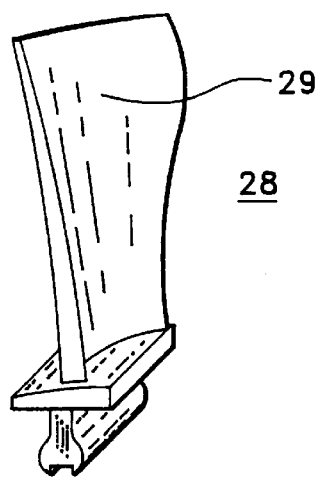
FIGS. 2, 3 and 4 illustrate parts of various components of a turbine that may be fabricated from the oxide ceramic composite of the present invention, namely a blade, a vane segment, and a shroud segment.
Figure 3:
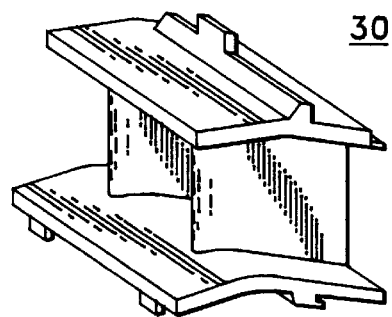
Figure 4:
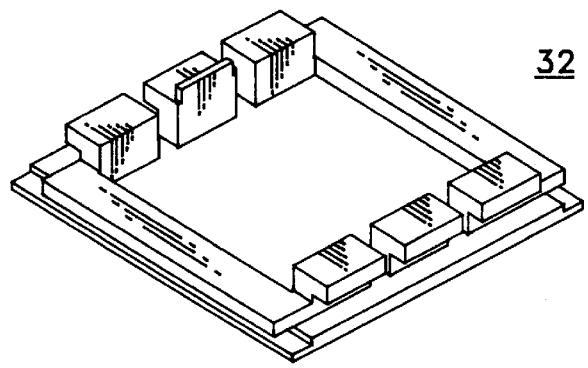

Referring now to FIG. 1, a longitudinal cross-section of a top half of a combustion turbine 10 is shown. Depicted in FIG. 1, moving from left to right, is air inlet 12, compressor 14, combustor shell 18, transition 20, turbine component 22, and air outlet 24. During turbine 10 operation, air 11 travels through compressor 14, where it becomes compressed air 15. Compressed air 15 is fed next into combustor shell 18 via compressed air feed 26, where it is mixed with fuel (not shown) from fuel feed 16 and the resulting mixture is combusted, creating combustion gases 19. Combustion gases 19 flow from combustion shell 18, through transition 20, and into turbine component 22. Combustion gases 19 moving through turbine component 22 cause turbine blade rows 34 arranged in turbine component 22 to rotate. After combustion gases 19 move through turbine component 22, they exit turbine 10 through air outlet 24.

Referring now to FIGS. 1–4, numerous components of turbine 10 reach extremely elevated temperatures during operation. Combustion gases 19 can cause the components and parts of the components to reach 1600° C. Some of these components are combustor shell 18, transition 20, and turbine component 22. Turbine component 22 is comprised of the parts blade 28, vane segment 30, and ring segment 32. All of these items and more are candidates for being fabricated from oxide ceramic composites.

In the preferred embodiment, the oxide ceramic composite is fabricated using a sol-gel process with a modified sol-gel precursor material. The sol-gel process is described in B. J. J. Zelinski and D. R. Uhlman, *Gel Technology in Ceramics,* 45 J. PHYS. CHEM. SOLIDS, No. 10, 1069 (1984), which is incorporated by reference herein. Briefly, the sol-gel process involves choosing an item to fabricate, providing a preform suitable for the item, infiltrating the preform with a sol-gel matrix precursor material, drying and calcining the infiltrated preform, sintering the infiltrated preform, and machining it to predetermined specifications. By using the modified sol-gel precursor material, less infiltrations will be needed to fabricate an oxide ceramic item of a specific percent theoretical density. Further, the instant invention will provide an oxide ceramic item having a percent theoretical density higher than previously possible for three dimensional oxide ceramic composite items.

Figure 5:
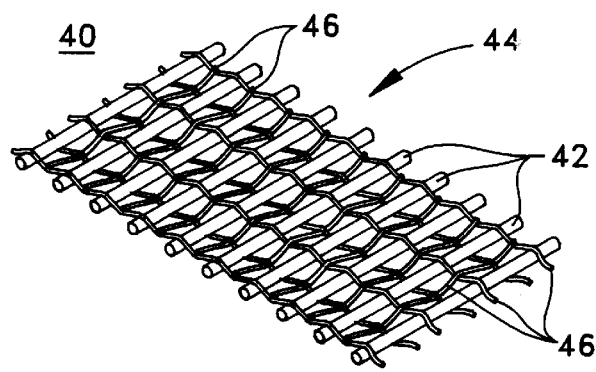
FIG. 5, 6 and 7 are detail views of various oxide ceramic preforms according to the present invention.
Figure 6:
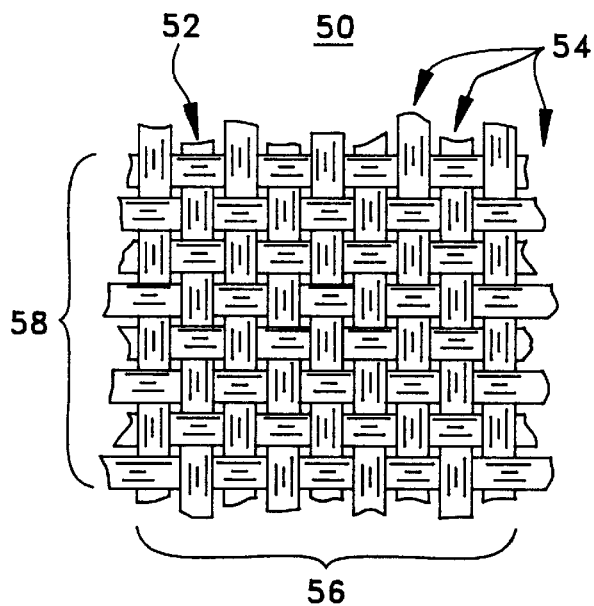
Figure 7:
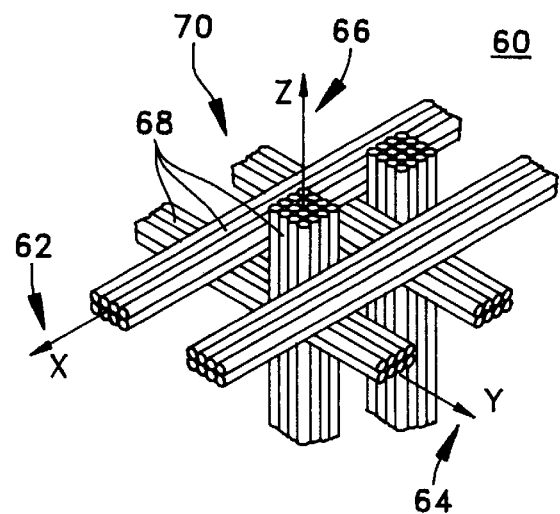

Blade 28 will be used as an example of an oxide ceramic component fabricated per the instant invention. The first step in fabricating an oxide ceramic composite component is to choose the type of preform for blade 28. Now referring to FIGS. 5, 6, and 7, the details of three types of preforms are depicted: 1D lay-up 40, 2D lay-up 50, and 3D preform 60. 1D lay-up 40 is a series of ceramic fibers 42, all of which are parallel to each other. Ceramic fibers 42 are secured in a weave 44 of fugitive fibers 46. Weave 44 is such that fugitive fibers 46 hold in place ceramic fibers 42 for composite processing. 2D lay-up 50 is a flat weave 52 of ceramic fibers 54. Typically, flat weave 52 is such that a first series of parallel aligned fibers 56 is woven into a second series of parallel aligned fibers 58. Further, the characteristics of both series of parallel aligned fiber 56, 58 are similar. The two series are oriented to be transverse to each other. 3D preform 60 is formed from ceramic fibers 68 woven in X-direction 62, Y-direction 64, and Z-direction 66, creating a three dimensional weave 70.

If the oxide ceramic composite item is to be a thin, simple shape, a 1D lay-up 40 or 2D lay-up 50 can be utilized. The lay-up is shaped to the desired size, which closely approximates the shape and size of the finished item. If required, a number of 1D lay-ups 40 or 2D lay-ups 50 can be arranged upon each other in order to build up the thickness (not shown). However, this type of arrangement can lead to delamination-type failures due to lack of through thickness fibers. Also, the strength of the component will be directional due to the arrangement of the fiber.

If the oxide ceramic composite item is to have a complex shape, such as blade 28, 3D preform 60 is utilized in the preferred embodiment. The benefits of using 3D preform 60 is that it has a high resistance to crack propagation in all directions compared to stacks of 1D lay-ups 40 and 2D lay-ups 50. The high resistance to crack propagation is due to the three-dimensional weave 70 of ceramic fibers 66.

Figure 8:
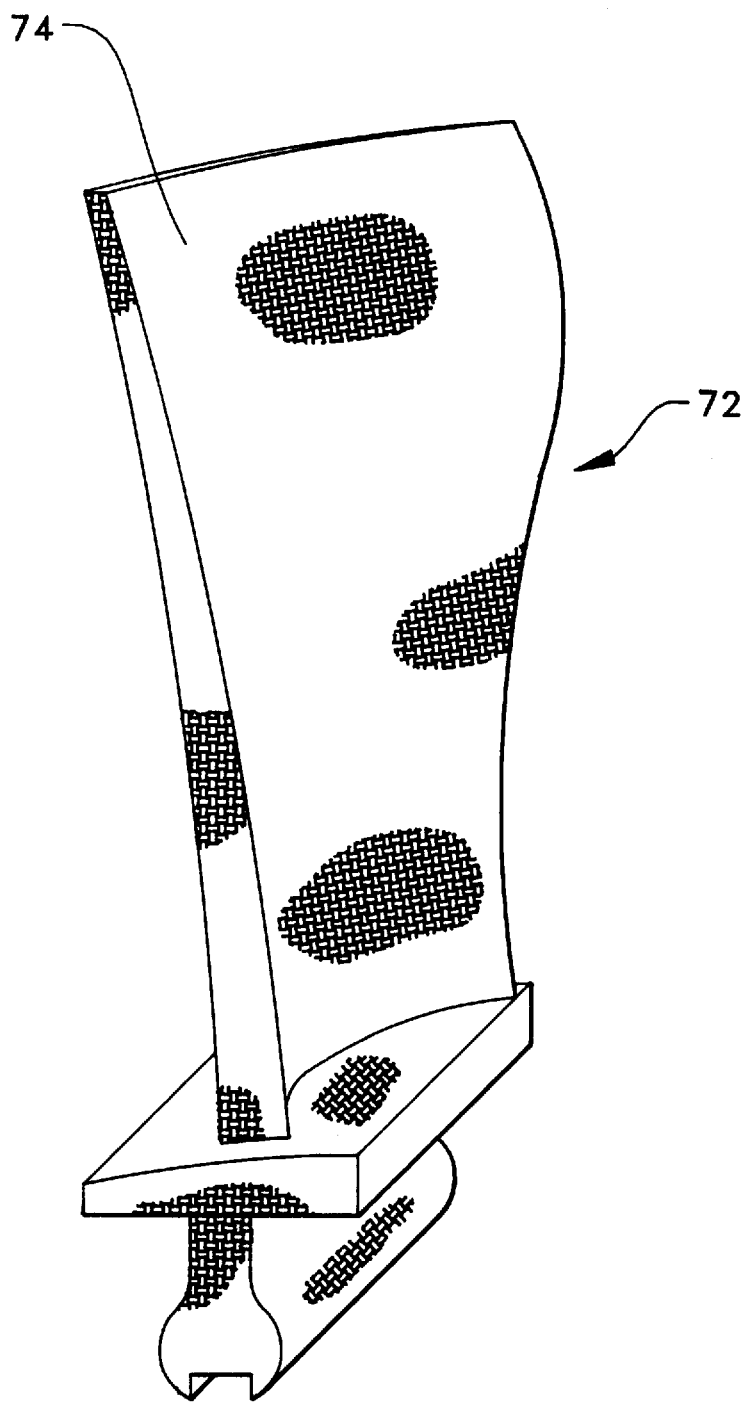
FIG. 8 is a perspective view of an oxide ceramic preform used to fabricate the blade shown in FIG. 2.

The next step is to shape the chosen preform into the approximate shape of the finished item. Referring now to FIG. 8, blade fiber preform 72 is shaped to be used to fabricate blade 28 shown in FIG. 2. It can be observed that the primary visible difference between blade 28 and blade fiber preform 72 is outer surface 29 of blade 28 and outer surface 74 of fiber preform 72. The difference between outer surface 29 and outer surface 74 is a result of a number of factors. First, blade fiber preform 72 is shaped to extremely approximate the shape of blade 28, thereby reducing differences. Second, ceramic fiber 68 comprises 40% of the volume of blade fiber preform 72. This allows blade fiber preform 72 to appear solid, further reducing differences. Third, ceramic fiber 68 is a bundle of 500-1000 individual fibers (not shown) each of which has a diameter of only 10 micrometers. The fineness of ceramic fiber 68 allows outer surface 74 to appear relatively smooth, much like outer surface 29 and still further reducing differences in appearance.

In the preferred embodiment, the next step in fabricating blade 28 is to create a mixture of metal particles (not shown) and sol-gel solution (not shown). The metal particles are in the form of a powder milled to a size of about 1 micrometer. The metal particles are so sized so that they are able to infiltrate blade fiber preform 72.

Other embodiments of the invention include larger metal particles and metal particles of various shapes, such as whiskers. In an alternative embodiment of the invention, the metal particles are dispersed throughout blade fiber preform 72 without being mixed in the sol-gel solution. One way this can be done is by dispersing the metal particles in a separate step. Another way to accomplish this is to have the metal particles become integral to ceramic fiber 66 either before or during the weaving process of the preform (not shown) used to form blade preform 72.

A further embodiment of the invention involves mixing nano-sized ceramic particles (not shown) into the mixture. The ceramic particles can be made of the same sol-gel matrix precursor material used to fabricate blade 28 or of any other suitable ceramic composition. The benefit of the ceramic powder is that it contains no volatile components, unlike the sol-gel mixture. Therefore, the ceramic powder will not change mass or volume during the fabrication of blade 28.

The remainder of the steps to form blade 28 follows typical process steps utilized to fabricate composites using the sol-gel process. A summary of the remaining steps for performing the preferred embodiment follows. Alternative embodiments may require appropriate deviations from the below description.

The next step is to infiltrate blade fiber preform 72 with the mixture, thereby creating an infiltrated preform (not shown). An infiltrated preform is made by infiltrating blade fiber preform 72 by immersion and pulling a vacuum to remove residual air trapped in the preform. Alternatively, the mixture can be applied on one side of blade fiber preform 72 and a vacuum pulled from the other side.

The next step is to dry and calcine the infiltrated preform. During the drying stage, the infiltrated preform is dried at room temperature. During the calcining stage, the dried infiltrated preform (not shown) is heated to partially remove the volatile components. However, it is not heated enough to react the components of the mixture. The parameters of the drying and calcining steps are dependent upon many factors including the dimensions of the infiltrated preform.

The next step is to determine if the green density target of the infiltrated fiber preform is met. The green density target is a predetermined minimum density of the infiltrated preform required to fabricate blade 28 to a predetermined percent theoretical density. If the green density target is not met, then the infiltrated preform undergoes the series of infiltrating, drying, calcining and determining green density steps repeatedly until the minimum green density target is met.

The next step is to densify fully the infiltrated preform by sintering it. Sintering involves heating the infiltrated preform to react the sol-gel matrix precursor material components together. Sintering will also volatilize any remaining volatile components of the sol-gel matrix precursor material. Additionally, sintering oxidizes the metal particles in the instant invention.

The benefit of metal particles dispersed throughout he infiltrated preform is realized in the sintering step. The benefit is added volume and added mass to the infiltrated preform which increases the percent theoretical density of blade 28. The benefit is derived by the metal particles reacting with oxygen to form a metal oxide (not shown).

Oxidized metal particles have a greater volume than the non-oxidized metal particles. This is shown quantitatively in TABLE I, Volumetric Increases Through Metal Oxidation.

TABLE I

VOLUMETRIC INCREASES THROUGH METAL OXIDATION

| Metal | Oxide | Volume Expansion, % |
|---|---|---|
| Al | $Al_2O_3$ | 28 |
| Zr | $ZrO_2$ | 49 |
| Ti | $TiO_2$ | 76 |
| Cr | $Cr_2O_3$ | 102 |
| Si | $SiO_2$ | 115 |

By the volume of the metal oxide being larger than the non-oxidized metal, part of the volume of the infiltrated preform lost during fabrication is replenished.

Oxidized metal particles have a greater mass than the non-oxidized metal particles. Oxygen, with its accompanying mass, is bound to the metal particles during oxidation. As shown in TABLE II, Mass Increase per Gram of Metal, this increase is substantial.

TABLE II

MASS INCREASE PER GRAM OF METAL

| Metal | Oxide | Percent Mass Increase per gram of Metal, % |
|---|---|---|
| Al | $Al_2O_3$ | 89 |
| Zr | $ZrO_2$ | 35 |
| Ti | $TiO_2$ | 67 |
| Cr | $Cr_2O_3$ | 46 |
| Si | $SiO_2$ | 114 |

This increase in mass and volume contributes to increasing the percent theoretical density of blade 28.

The metals listed in TABLE I and TABLE II are mere examples of metals which can be used to practice the invention. Any metal which increases in volume and mass when oxidized is a potential substance to mix with the sol-gel material. What metals are used, whether or not to use ceramic powder, and the amounts of each component depends upon the dimensions of the ultimate item, the desired percent theoretical density, and other factors.

Besides the ability to fabricate a component with a higher percent theoretical density, the instant invention has at least one significant economic advantage. There is a significant cost increase each time the infiltration step is performed during composite fabrication. The number of times the infiltration step is performed is partially dependent upon the rate of increase of the volume and mass of the composite. The faster the rate of increase of the volume and mass of the composite, the fewer the infiltration steps that need to be performed. As the present invention enhances the rate of increase of the volume and mass of a composite during fabrication, fewer infiltration steps will be required to fabricate a composite.

While the preferred embodiment of the present invention is the fabrication of oxide ceramic composites components or parts of components for combustion turbines, the invention is not limited to that machine. Any component or part of a component which is exposed to extremely elevated temperatures is a potential oxide ceramic composite candidate. This includes any combustion engine, device in which combustion takes place, or device which is exposed to high temperatures, to name a few. Also, because the instant invention requires less infiltrations, it can be used to economically fabricate ceramic composites for any use.

The present invention allows fabrication of parts that have the strength and resistance to high temperatures, therefore, allowing the parts to be used in combustion turbines and other similar environments. In particular, the present invention allows the fabrication of parts to be used in turbines operating at increased temperatures and efficiencies.

The present invention may be embodied in other specific forms without departing from the spirit or essential attributes thereof, and accordingly, reference should be made to the appended claims, rather than to the foregoing specification, as indicating the scope of the invention.

What is claimed is:

1. A method of fabricating an oxide ceramic composite comprising the steps of:

providing a fiber preform defining a volume;

dispersing metal particles throughout at least a portion of the volume;

infiltrating at least a portion of the volume with a sol-gel matrix precursor material to fabricate an infiltrated preform;

sintering the infiltrated preform; and oxidizing at least a portion of the dispersed metal particles.

2. The method of claim 1, wherein the sol-gel matrix precursor material comprises ceramic powder.

3. The method of claim 1, wherein the fiber preform is an oxide fiber preform.

4. The method of claim 1, wherein:

the method further comprises the step of mixing the metal particles into the sol-gel matrix precursor material prior to the dispersing step; and the dispersing and infiltrating steps are performed concurrently.

5. The method of claim 1, wherein the method further comprises the step of oxidizing the metal particles after the infiltrating step.

6. The method of claim 1, wherein the method further comprises the steps of calcining the infiltrated preform and sintering the infiltrated preform.

7. The method of claim 6, wherein the method further comprises the step of repeating the infiltrating step and the calcining step until a green density threshold of the infiltrated fiber preform is surpassed.

8. The method of claim 2, wherein said ceramic powder is the same material as said sol-gel matrix precursor.

9. The method of claim 7, wherein the green density threshold is greater than seventy percent of a corresponding theoretical density.

* * * * *